(12) United States Patent
Liu et al.

(10) Patent No.: US 11,276,167 B2
(45) Date of Patent: Mar. 15, 2022

(54) IMAGE DATA PROCESSING METHOD, DEVICE AND SYSTEM

(71) Applicant: KONINKLIJKE PHILIPS N.V., Eindhoven (NL)

(72) Inventors: Hong Liu, Helmond (NL); Gerardus Henricus Maria Gijsbers, Liempde (NL); Jean-Luc Francois-Marie Robert, Cambridge, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 56 days.

(21) Appl. No.: 16/769,638

(22) PCT Filed: Nov. 20, 2018

(86) PCT No.: PCT/EP2018/081954
§ 371 (c)(1),
(2) Date: Jun. 4, 2020

(87) PCT Pub. No.: WO2019/110295
PCT Pub. Date: Jun. 13, 2019

(65) Prior Publication Data
US 2021/0183056 A1 Jun. 17, 2021

Related U.S. Application Data

(60) Provisional application No. 62/594,332, filed on Dec. 4, 2017.

(30) Foreign Application Priority Data

Dec. 19, 2017 (EP) .................................... 17208411

(51) Int. Cl.
*G06T 7/00* (2017.01)
*G06T 7/38* (2017.01)
*G06T 7/30* (2017.01)

(52) U.S. Cl.
CPC .............. *G06T 7/0012* (2013.01); *G06T 7/30* (2017.01); *G06T 7/38* (2017.01); *G06T 2200/04* (2013.01);
(Continued)

(58) Field of Classification Search
CPC ..... G06T 7/0012; G06T 7/38; G06T 2200/04; G06T 2207/10136; G06T 2207/30048;
(Continued)

(56) References Cited

U.S. PATENT DOCUMENTS 5,946,425 A 8/1999 Bove, Jr. et al.
9,076,201 B1 * 7/2015 Negahdar ................. G06T 7/30
(Continued)

FOREIGN PATENT DOCUMENTS

WO 9934330 A1 7/1999
WO 2005004052 A2 1/2005
WO 2007099525 A2 9/2007

OTHER PUBLICATIONS

Bystrov et al. "Local Motion Analysis in 4D Lung CT Using Fast Groupwise Registration." 16th IEEE International Conference on Image Processing, Nov. 7, 2009, pp. 1749-1752 (Year: 2009).*
(Continued)

*Primary Examiner* — Jon Chang

(57) ABSTRACT

An image data processing method is for registering two four-dimensional image data sets, each representative of a time-series of three-dimensional image frames. The method comprises an initial pre-registration step in which 3D image frames of the two image data sets are rotated and translated (16) relative to one another so as to bring into alignment respective dominant motion vectors identified (14) for each, the dominant motion vector being a 3D motion vector
(Continued)

representative of motion of an identified three-dimensional sub-region exhibiting maximal spatial displacement over course of the time series.

20 Claims, 2 Drawing Sheets

(52) U.S. Cl.
CPC ............... *G06T 2207/10132* (2013.01); *G06T 2207/10136* (2013.01); *G06T 2207/20016* (2013.01); *G06T 2207/30048* (2013.01)

(58) Field of Classification Search
CPC ............. G06T 7/30; G06T 2207/10132; G06T 2207/20016; G06T 2207/10076
See application file for complete search history.

(56) References Cited

U.S. PATENT DOCUMENTS

2006/0002632 A1 1/2006 Fu et al.
2012/0078097 A1* 3/2012 Wang ..................... A61B 8/483
600/437

OTHER PUBLICATIONS

Fu et al. "Four Dimensional Image Registration for Intravital Microscopy." IEEE Conference on Computer Vision and Pattern Recognition Workshops, Jun. 26, 2016, pp. 1390-1398 (Year: 2016).*
Yang et al: "Level Set Motion Assisted Non-Rigid 3D Image Registration"; Proceedings of SPIE—The International Society for Optical Engineering, Mar. 2007, 11 Page Document.
Castillo et al: "Four-Dimensional Deformable Image Registration Using Trajectory Modeling"; Phys. Med. Biol., vol. 55 (2010), pp. 305-327.
Deubler et al: A Wavelet-Based Multiresolution Method To Automatically Registger Images; Journal of Mathematical Imaging and Vision 7, pp. 199-209, 1997.
Pratikakis et al: "Robust Multi-Scale Non-Rigid Registration of 3D Ultrasound Images"; LNCS 2106, pp. 389-397, 2001.
PCT/EP2018/081954 ISR and WO, Mar. 18, 2019, 14 Page Document.

* cited by examiner

IMAGE DATA PROCESSING METHOD, DEVICE AND SYSTEM

CROSS-REFERENCE TO PRIOR APPLICATIONS

This application is the U.S. National Phase application under 35 U.S.C. § 371 of International Application No. PCT/EP2018/081954, filed on Nov. 20, 2018, which claims the benefit of U.S. Provisional Patent Application No. 62/594,332, filed on Dec. 4, 2017 and European Patent Application No. 17208411.3, filed on Dec. 19, 2017. These applications are hereby incorporated by reference herein.

FIELD OF THE INVENTION

This invention relates to an image data processing method and device, and in particular an image data processing method and device for spatially registering two four dimensional image data sets.

BACKGROUND OF THE INVENTION

Multi-perspective medical imaging, for instance in the field of ultrasound imaging, is a frequently applied imaging approach. The approach is based on imaging a same common anatomical region of a subject's body but from two different viewpoints. This allows greater detail to be obtained in respect of the imaged region. It in addition allows parts of the region not visible from one viewpoint (e.g. due to obstructions) to nonetheless be represented in a final image, due to the additional image information acquired from the further viewpoint.

To obtain a single final image from the image data sets acquired at each viewpoint, it is necessary to perform a process of image registration. Registration consists in aligning the image data acquired in each data set such that the common visual features captured in each are rendered in alignment with one another (e.g. that they overlap with one another). The two can then be combined or fused.

One field in which this process is of particular applicability is that of ultrasound imaging.

The registration or fusion of two real-time 3D ultrasound volumes (also known as 4D volumes or 4D image data sets) is a key step in multi-perspective echography, allowing the imaged field of view to be extended, and for missing information in one captured image data set to be supplemented by the information captured in the other. Moreover, fused echography provides for improved image quality and surgical device visibility.

Prior-art methods for achieving registration of 4D ultrasound volumes typically make use of an optimization process based on combined similarity scores of intensity-normalized 2D images from selected 2D slices of the volumes to obtain the correct alignment of the 4D volumes. This optimization process may further use representations of each 4D volume at different levels of detail (as represented in a so-called scale space) in order to increase the chances of converging to a meaningful solution.

However, the performance of this known approach has proven far from satisfactory in practice, as it often leads to inaccurate alignment of the 4D volumes, and hence a poor quality final fused image.

Methods for registering 4D image data sets are therefore sought which are able to achieve improved results.

SUMMARY OF THE INVENTION

The invention is defined by the claims.

According to an aspect of the invention, there is provided an image data processing method for spatially registering two image data sets, comprising:

obtaining two different four-dimensional image data sets, each comprising image data representative of a time series of three dimensional image frames of a common anatomical region;

identifying for each four-dimensional image data set a respective three-dimensional motion vector indicative of motion of an identified three-dimensional sub-region which exhibits maximal spatial displacement over at least a portion of the respective time series of frames;

performing a rotation and translation of one or both of the four-dimensional image data sets such as to bring their respective three-dimensional motion vectors into alignment; and performing a further transformation of one or both of the image data sets having aligned three-dimensional motion vectors, based on an image registration procedure, such as to bring the two image data sets into spatial registration.

The invention is based on the concept of performing an initial 'rough alignment' step in which the two four-dimensional image data sets are rotationally and translationally aligned in accordance with the direction of a single dominant motion vector identified in each. The dominant motion vectors correspond to the motion of a sub-region identified in each image data set which over the course of a set of three-dimensional image frames comprised in the set undergoes the greatest displacement in the imaged field of view.

By first aligning the image data sets in accordance with this single vector representative of the most dominant motion occurring within the field, it has been found by the inventors that the robustness and accuracy of the final registration is significantly improved. Selecting a single vector having the largest motion component (as opposed e.g. to determining multiple motion vectors corresponding to the motion of multiple points) enhances the probability of accuracy in the rotational alignment, since this largest component is likely to be representative of motion of a significant structural feature, rather than e.g. extraneous features or even noise artefacts. Hence the derived motion vector in each image data set gives a good estimation of motion of a most dominant element of anatomical structure in each 4D volume.

By four-dimensional image data set is meant image data representative of a time series of three dimensional image frames (i.e. three spatial dimensions plus time). This is otherwise known in the art as a four-dimensional volume.

The image data sets may in examples be ultrasound image data sets, or may be image data sets acquired using a different imaging method or modality which is capable of acquiring series of 3D image frames of an anatomical region from two distinct angular viewpoints.

By 'vector' may be meant a vector within a three-dimensional (coordinate) space existing within the space of the images represented by the image data set, i.e. a three dimensional space of the physical region or area captured or represented within each of the images (3D image frames).

By 'rotation' is meant a rotation within this 3D coordinate space subsisting in the physical space represented or captured by the 3D image frames of the image data set, as defined above. By 'translation' is likewise meant a translation in this 3D coordinate space.

A sub-region of maximal spatial displacement is identified within the 4D image data set. By this is meant that a three-dimensional (i.e. spatial) region is identified which through the course of at least a part of the series of 3D image frames constituting the 4D image data is found to undergo the greatest spatial displacement.

The sub-region may be characterized by the particular image features which exist or are located within that region or are encompassed by that region. Displacement of the region may hence effectively be characterized by, or manifest in, a displacement of those image features, such that the region characterized by them too is found to move.

Hence, this step of the method may comprise identifying the three-dimensional sub-region within frames of the 4D image data set, characterized by one or more graphical or visual features, which is found, by virtue of displacement of those features throughout the course of the series of frames, to itself displace by the greatest amount, i.e. the greatest spatial displacement within the 3D coordinate space existing within the (physical) space represented or captured in the 3D image frames.

'Transformation' is used in the mathematical sense and includes for instance the linear transformations of translation, rotation and reflection. The transformation is again performed within a three-dimensional coordinate space defined by the images (3D image frames) of the image data set, as discussed above.

Bringing the motion vectors into alignment may mean in examples rotating and translating one or both of the image data sets (i.e. relatively rotating and relatively translating the image data sets) so as to render their respective derived motion vectors parallel (or substantially parallel) and coincident (or substantially coincident) with one another.

Bringing into spatial registration may comprise bringing the two image data sets into more complete or more accurate (spatial) alignment with one another, e.g. in terms of common image features captured in the images (3D image frames) of each image data set, i.e. to bring said common features into alignment with one another, or e.g. in terms of intensity patterns of the two image data sets.

Bringing into spatial registration may comprise bringing the two image data sets into (e.g. complete or more accurate) spatial coincidence with one another, e.g. in terms of the spatial positioning of visual or graphical features of 3D image frames represented by the image data sets.

Bringing into spatial registration may comprise performing a transformation to render the image data sets overlapping with one another e.g. in terms of common visual features or intensity values existing in frames of the two image data sets.

The further transformation is based on an image registration procedure. Image registration is a well-understood concept in the technical field of this invention, and encompasses a number of different algorithmic approaches. The image registration procedure may be based on an image matching procedure for instance, e.g. an image matching algorithm. The image matching algorithm may be an intensity matching algorithm or feature matching algorithm in particular examples. In intensity matching, intensity characteristics, e.g. an intensity distribution, of 3D fames of the two image data sets may be matched with one another through a transformation, thereby bringing the images into registration.

The further transformation in any example may be a linear transformation or may be an elastic or non-rigid transformation for instance.

The obtaining of the four-dimensional image data sets may in particular examples comprise receiving the image data sets via a communication channel, for instance from a remote computer, e.g. a server. In further examples, obtaining the four-dimensional image data sets may comprise receiving the image data sets from one or more image acquisition devices such as for instance one or more imaging probes. These may be one or more ultrasound imaging probes in examples for instance.

Where only one imaging probe is used, the two image data sets are obtained at different times. Where two or more imaging probes are used, the image data sets may be obtained simultaneously.

In accordance with one or more examples, identifying the three-dimensional motion vector may comprise, for at least one of the image data sets: processing the image data set to derive a corresponding reduced resolution image data set; and identifying within the reduced resolution image data set said three-dimensional sub-region exhibiting maximal spatial displacement over at least a portion of the series of frames represented by the image data set.

By detecting the sub-region of maximal spatial displacement through processing or analysis of a reduced resolution version of the original four-dimensional image data set (the original four-dimensional volume), improved robustness against noise artefacts is achieved. Noise very typically afflicts both 3D and 4D volumes captured in image data sets (this manifests in the images looking grainy). Lower resolution image frames typically comprise fewer noise artefacts. Hence by identifying the sub-region of greatest displacement within the reduced resolution image data set, there is less possibility of erroneous identification of the sub-region due to e.g. an apparent large regional motion which is in fact the manifestation of a mere noise artefact. Robustness of the alignment is thus improved.

By 'corresponding' image data set may be meant an image data set representative of the same series of three-dimensional image frames (i.e. representative of the same visual content), but wherein each of the frames has a lower resolution than the original obtained image data set.

For the avoidance of doubt, 'resolution' refers to image resolution. This is a well-understood term of the art within the field of digital imaging and image processing. It may refer for instance to pixel resolution (e.g. the density of pixels within 3D image frames represented by each of the image data sets), or may refer to spatial resolution or any other metric or measure of image resolution.

By 'reduced resolution' is meant reduced relative to the original obtained four-dimensional image data set. In addition, by reduced resolution image data set is meant an image data set comprising a time series of 3D image frames, wherein the comprised 3D image frames have a reduced resolution compared to the 3D image frames comprised by the original 4D image data set.

In accordance with particular examples, the method further comprises identifying a sub-region within the original image data set corresponding to the sub-region identified in the reduced resolution data set, and wherein identifying the three-dimensional motion vector comprises identifying a vector indicative of motion of said corresponding region in the original image data set.

For the avoidance of doubt, 'original image data set' means the four dimensional image data set originally obtained by the method, i.e. the four-dimensional image data set comprising image data representative of a time series of three dimensional image frames of a common anatomical region according to the embodiments of the present disclosure.

In this set of examples, the 3D sub-region identified in the reduced resolution image data set (i.e. the 3D frames of the reduced resolution image data set) is effectively mapped to the original image data set (i.e. to the 3D frames of the original 4D image data set). The 3D motion vector, representative of the motion of this region, is then determined based on detected motion of the corresponding region through the course of the 3D image frames of the original 4D image data set.

In alternative examples, the 3D motion vector may be determined in respect of determined motion of the sub-region through the course of the 3D frames of the reduced resolution image data set, and both the determined motion vector and the identified sub-region then mapped to the original 4D image data set.

By 'corresponding to' may be meant a three-dimensional sub-region within the 3D image frames of the original 4D image data set which is characterized by, or which contains or comprises or encompasses the same visual features as does the sub-region identified in the reduced resolution image.

In accordance with one or more examples, the method may comprise processing the at least one four dimensional image data set to derive a plurality of reduced resolution image data sets, each having a different respective resolution, and identifying said three-dimensional sub-region exhibiting maximal spatial displacement within the reduced resolution image data set having lowest resolution.

By different respective resolution may be meant that each of the reduced resolution image data sets has a different relative resolution, or a different absolute resolution.

More particularly, in these cases, identifying said corresponding sub-region within the original data set may comprise sequentially mapping the identified sub-region of maximal spatial displacement in turn between the reduced resolution image data sets, starting from the lowest resolution data set and subsequently proceeding to the original data set.

In these examples, the sub-region of maximal displacement is identified in the lowest resolution 4D image data set. Since noise is reduced for lower resolution images, by selecting the lowest resolution image data set for identifying the maximal displacement sub-region, robustness against potential error in identification of the sub-region due to noise artefacts is increased by the greatest amount.

By then successively mapping, or propagating, the identified sub-region upwards through the different resolution image data sets, the quality of the image data is improved (due to the improved resolution) without losing the accuracy and noise robustness of the identified sub-region.

In addition to identifying and mapping the sub-region of maximal displacement from the lowest resolution 4D image data set, in accordance with one or more examples, the three-dimensional motion vector may be identified in respect of the identified sub-region in the lowest resolution data set and this also mapped upwards through the plurality of different resolution data sets.

By 'mapping the identified sub-region in turn between the reduced resolution image data sets' may be meant simply identifying in each respective reduced resolution image data set a sub-region corresponding to the identified sub-region.

In particular, in examples, the plurality of reduced resolution 4D image data sets are effectively ordered or stacked in order of increasing resolution, and the identified sub-region is mapped progressively 'upward' through the successively increasing resolution 4D data sets until the original 4D image data set is reached.

In accordance with one or more examples, each of the plurality of reduced resolution image data sets may be representative of a respective time-series of 3D image frames having reduced overall size, and wherein the mapping from one data set to another comprises increasing a size of said identified sub-region of maximal displacement in proportion to a difference in relative sizes of 3D image frames of the two image data sets.

By size is meant spatial size, i.e. as characterized by spatial dimensions of the region.

In these examples, in addition to comprising 3D image frames having a reduced resolution compared to the original 4D image data set, the 3D image frames of the reduced resolution image data sets are also smaller in size than the 3D image frames of the original image data set.

Mapping the identified region from a first 4D image data set to a second in these examples may simply comprise enlarging the size of the identified region in scale with the size increase between the first 4D image data set and the second. This may be done for instance while maintaining the center point of respective region within the image frame static.

This provides a simple and effective means of achieving the mapping, without requiring complex processing or analysis to be performed.

By 'reduced overall size' may in particular examples be meant that the 3D image frames are smaller in overall area or other otherwise that dimensions are smaller. The reduced size may mean reduced in terms of pixel dimensions, or in terms of any other metric or quantification.

The image registration procedure may be based on maximizing a similarity metric determined between one or more frames comprised by each of the image data sets.

In particular, similarity scores may be determined between respective frames of the two image data sets for different possible transformations, and the transformation then optimized for greatest similarity score. This therefore ensures best possible alignment or registration between 3D image frames of the two image data sets, since a good similarity score indicates good spatial alignment of visual or graphical features. The similarity metric may in particular examples be based on similarity of intensity distributions or intensity features of 3D image frames of the two image data sets.

In accordance with one or more examples, the further transformation may comprise a translation.

In accordance with one or more examples, the two four-dimensional image data sets may comprise image data representative of different spatial viewpoints of the anatomical region.

In these examples, the 3D image frames constituting each 4D image data set may be representative of said common anatomical region, but each represent the region as 'observed' or imaged from a different spatial viewpoint or perspective.

In examples, the two 4D image data sets may for instance comprise image data captured or acquired from an imaging probe or probes being positioned at a different position or angle with respect to the anatomical region.

In accordance with one or more examples, viewing directions corresponding to the two spatial viewpoints may be separated by an angle of at least 25 degrees.

The method of the present invention is of particularly advantageous application in cases in which the two 4D image data sets comprise image data captured from different viewpoints having a large angular displacement with respect to one another. In such cases, prior art methods typically result in erroneous registration.

By contrast, the method of the present invention is able to achieve significantly improved results by virtue of the novel pre-registration step in which the two image data sets are first rotated and translated so as to bring their motion vectors into alignment. This rotation and translation step ensures that any large angular displacement between viewpoints is corrected in advance of more fine-grained alignment adjustments performed in the final transformation step.

In accordance with one or more examples, generating the reduced resolution image data set(s) may comprise processing the four-dimensional image data set with a low pass spatial filter. This may be a Gaussian filter in examples.

In examples, the method may be an ultrasound image data processing method.

In more particular examples, the method may be a cardiac ultrasound image data processing method.

In such cases, optionally said common anatomical region represented by the two four-dimensional image data sets may correspond to a region encompassed by an apical four-chamber view of a heart.

In cases in which the cardiac region is imaged, capturing of the image data sets is preferably temporally synchronized according to the cardiac cycle. Capturing of the two 4D image data sets may in particular examples be ECG gated such that the image sets each begin at the same cardiac phase.

The apical four-chamber view is a term of the art and refers to a viewpoint in which all four chambers of the heart are captured in the resulting image data (the right and left ventricle and right and left atrium).

In accordance with a further aspect of the invention, there is provided an image processing device comprising:
  a processor adapted to
    obtain two different four-dimensional image data sets, each comprising image data representative of a time series of three dimensional image frames of a common anatomical region;
    identify for each four-dimensional image data set a respective three-dimensional motion vector indicative of motion of an identified three-dimensional sub-region which exhibits maximal spatial displacement over at least a portion of the respective time series of frames;
    perform a rotation and translation of one or both of the four-dimensional image data sets such as to bring their respective three-dimensional motion vectors into alignment; and
    perform a further transformation of one or both of the image data sets having aligned three-dimensional motion vectors, based on an image registration procedure, such as to bring the two image data sets into spatial registration.

In accordance with a further aspect of the invention, there is provided an ultrasound imaging system comprising:
  one or more ultrasound transducer units; and
  a processor assembly adapted to:
    process signal data received from the one or more ultrasound transducer units to obtain two different four-dimensional image data sets, each comprising image data representative of a time series of three dimensional image frames of a common anatomical region;
    identify for each four-dimensional image data set a respective three-dimensional motion vector indicative of motion of an identified three-dimensional sub-region which exhibits maximal spatial displacement over at least a portion of the respective time series of frames;
    perform a rotation and translation of one or both of the four-dimensional image data sets such as to bring their respective three-dimensional motion vectors into alignment; and
    perform a further transformation of one or both of the image data sets having aligned three-dimensional motion vectors, based on an image registration procedure, such as to bring the two image data sets into spatial registration.

In examples, the processor assembly may comprise a single processor, or may make use of a plurality of processors, e.g. performing dedicated tasks. Detailed examples will be described in sections to follow.

In accordance with one or more examples, the system may comprise two ultrasound transducer units, and wherein the two different four-dimensional image data sets are obtained using signal data received from a different one of the two ultrasound transducer units. Preferably, in use, the transducer units may be positioned at different angular positions relative to the anatomical region when collecting the respective four-dimensional image data sets.

In alternative examples, the system may comprise a single ultrasound transducer unit, and wherein the two different four-dimensional image data sets are obtained using signal data captured by the single transducer unit over different respective time periods. Again, in preferable examples, in use, the single transducer unit is positioned at different angular positions relative to the anatomical region when capturing the two four-dimensional image data sets.

Features of examples and embodiments outlined in relation to one aspect of the invention (e.g. the processing method described above) may in advantageous embodiments be combined with or incorporated into any other aspect of the invention in further examples.

BRIEF DESCRIPTION OF THE DRAWINGS

Particular embodiments of the invention will now be described in detail, by way of example only, with reference to the accompanying drawings, in which.

DETAILED DESCRIPTION OF THE EMBODIMENTS

The invention provides an image data processing method for registering two four-dimensional image data sets, each representative of a time-series of three-dimensional image frames. The method includes an initial 'rough' alignment step in which the image content of the two image data sets is processed with a relative rotation and translation so as to bring into alignment a dominant motion vector identified in each, the dominant motion vector being a 3D motion vector representative of motion of an identified three-dimensional sub-region exhibiting maximal spatial displacement over course of the time series.

Embodiments of the present invention provide a method for processing at least two image data sets to achieve registration of their respective image content. Each image data set comprises image data representative of a time series of three-dimensional image 'frames' capturing a particular anatomical region or area. Each of these 3D frames may be referred to as a 3D volume. The full time series of 3D volumes may be referred to as a four-dimensional volume (three spatial dimensions, plus time). The 4D volume in this context refers to the image content itself. Reference in this disclosure to rotation of image data sets may be taken to be reference to rotation of the 4D volume, i.e. rotation in three-dimensions of the 3D image content of the respective 4D volume. The same is also true of reference to translation: this may refer to translation of the 4D volume, i.e. translation in three-dimensions of the 3D image content of the respective 4D volume.

Figure 1:
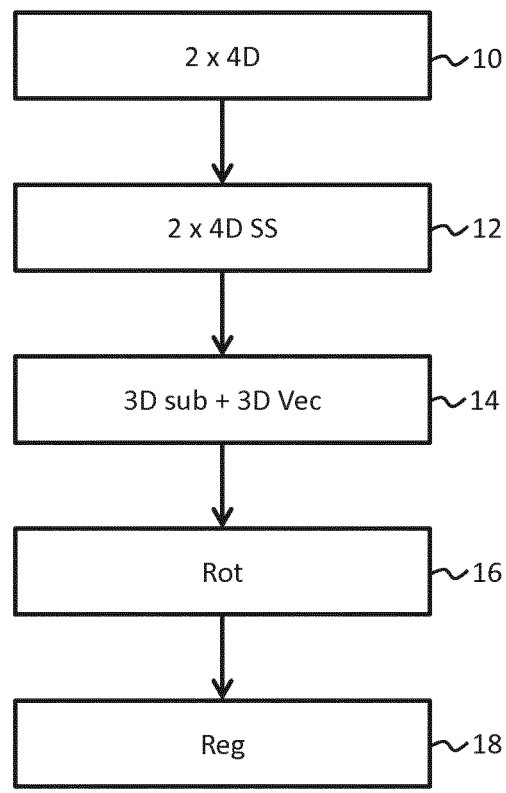
FIG. 1 shows in block diagram form an example method in accordance with one or more embodiments of the invention.

An example method is shown in block diagram form in FIG. 1.

In summary, the example method of FIG. 1 comprises the following steps.

First, in step 10, two 4D image data sets are obtained, each comprising a time-series of 3D image frames, and each 4D image data set being representative of a common anatomical region. This step is labelled as "2×4D" in FIG. 1.

Second, in step 12, each 4D image data set is processed in order to generate a plurality of reduced resolution versions of the image data set. This plurality of reduced resolution versions is known as a scale space of the image data set. This step is labelled as "2×4D SS" in FIG. 1.

Third, in step 14, a three-dimensional sub-region is identified within the four-dimensional volume of each data set which exhibits the greatest spatial displacement across the series of 3D volume frames. A three-dimensional motion vector is then identified, representative of the motion of the maximal displacement sub-region over the course of the series of 3D image frames. This sub-region and vector are identified in respect of the lowest resolution image data set, before being mapped iteratively between each of the intermediate reduced resolution image data sets up to the highest resolution data set (the original 4D image data set) is reached. Determining the motion vector at the lowest resolution level maximizes robustness against noise. Iteratively mapping the motion vector back up through the plural resolution levels restores accuracy lost by reducing the resolution. This step is labelled as "3D sub+3D Vec" in FIG. 1.

Fourth, in step 16, an initial pre-registration alignment procedure is performed in which the 3D volumes of one or both of the 4D image data sets are rotated and translated so as to bring into alignment their respective identified dominant 3D motion vectors. This step is labelled as "Rot" in FIG. 1.

Finally, in step 18, final registration of the two image data sets is achieved by performing an optimization process, based on combined similarity scores of normalized 2D images from selected 2D 'slices' (as described above). This step is labelled as "Reg" in FIG. 1.

These steps will now be explained in more detail below, with reference to FIGS. 2 to 4.

In a first step 10, two four-dimensional image data sets are obtained, each comprising a time series of three-dimensional image frames. Each image data set is hence representative of a respective 4D volume, where a common anatomical region is depicted or encompassed within the field of view of each of the comprised 3D frames.

The two image data sets may be obtained using a set of two image data acquisition devices, e.g. in the form of imaging probes, arranged in use for capturing the common anatomical region from different viewpoints.

Figure 2:
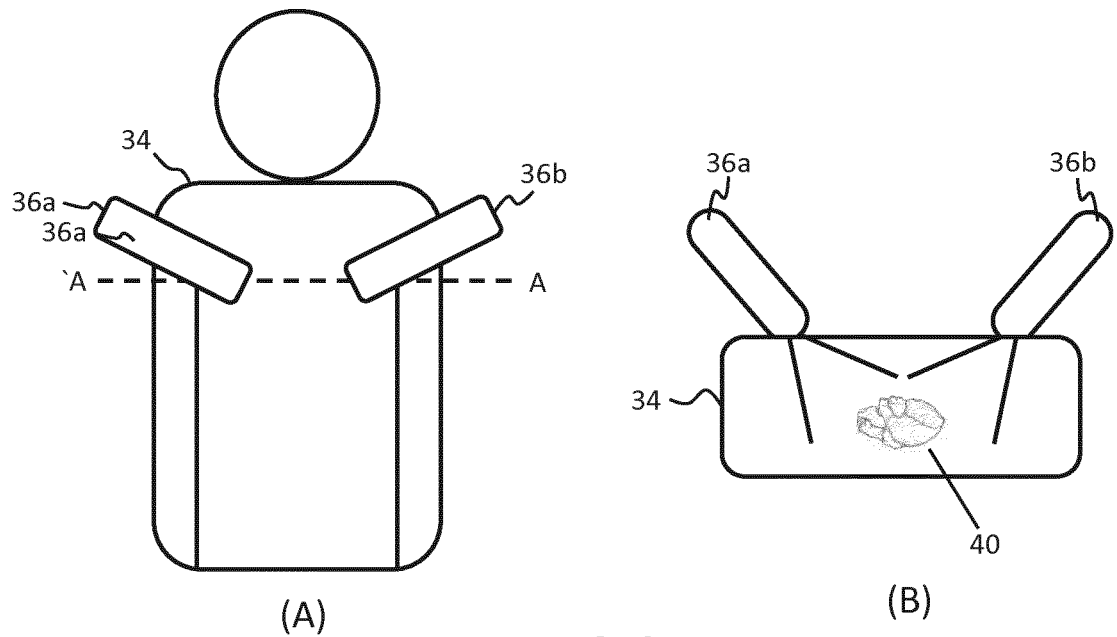
FIG. 2 schematically illustrates an example of acquisition of two four-dimensional image data sets.

This is illustrated in FIG. 2, which shows by way of example a pair of ultrasound imaging probes 36a, 36b positioned on the body of a patient 34, arranged at different angular positions relative to the patient's heart 40. FIG. 2B shows a sectional view through the patient's chest, along line A-A in FIG. 2A. As shown, the two ultrasound imaging probes are positioned such that the patient's heart is within the field of view of each probe, with each probe arranged at a different angular viewpoint with respect to the heart.

In advantageous examples, a first imaging probe may be positioned such as to capture an apical four-chamber view of a cardiac region of the patient, and a second imaging probe may be positioned in alignment with the Parasternal Long axis. Such a set of positions achieves a particularly advantageous complement of imaging detail and features when imaging a cardiac region. In some examples, the two imaging probes may be arranged for capturing image data representative of just one region of the heart, e.g. the left ventricle, or the mitral valve.

Two imaging probes are used in the example of FIG. 2 to capture the two 4D image data sets. In alternative examples, a single imaging probe (or other image acquisition device) could alternatively be used to capture the two 4D image data sets. The probes may be ultrasound imaging probes or may employ a different imaging modality. In use, the single imaging probe may be controlled to capture the two 4D image data sets when positioned at different locations relative to the anatomical region being imaged. For instance, the single imaging probe may acquire the first image data set when positioned at the position shown for probe 36a in FIG. 2B, before being moved to the position shown for imaging probe 36b to capture the second image data set.

Once the two four-dimensional image data sets have been acquired, in a second step 12, each image data set is processed in order to generate a plurality of reduced resolution versions of the image data set. The result in each case is a set of three or more four-dimensional volumes (including the original 4D volume), each consisting of the same image content as the original 4D volume, but at a different (reduced level of) image resolution. This series of differently reduced resolution image data sets (4D volumes) is known as a 'scale space' (4D SS).

Figure 3:
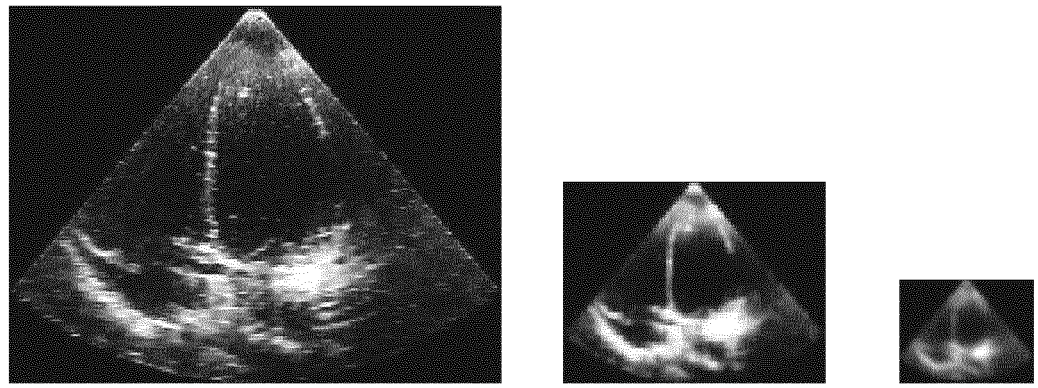
FIG. 3 shows 2D slices through 3D frames of an example set of different resolution 4D image data sets.

An example scale space for one exemplary 4D image data set (4D volume) is depicted in FIG. 3. The scale space is a three-level scale space. FIG. 3 shows for illustrative purposes the respective scale space levels of just a single 3D volume frame of the 4D volume in question, and illustrated by means of just a particular 2D slice through each of the 3D volumes. The left-most slice depicts the original image data set. The two remaining slices represent each of a set of two reduced resolution image data sets. The image data sets decrease in resolution from left to right. In addition to decreasing in resolution, the reduced resolution image data sets are also each reduced in size relative to each higher resolution image data set.

The scale space of reduced resolution image data sets may be generated by processing the 3D volumes of the original 4D image data set with a spatial filter, such as a Gaussian filter.

Once the scale space of multiple reduced resolution image data sets has been generated, in a third step 14, a three-dimensional sub-region (3D sub) is identified within the four-dimensional volume which exhibits the greatest spatial displacement across the series of 3D volume frames. A three-dimensional motion vector (3D Vec) is then identified, representative of the motion of the maximal displacement sub-region over the course of the series of 3D image frames.

Identification of the maximal displacement sub-region and associated 3D motion vector comprises a number of sub-steps.

First, a 3D sub-region exhibiting maximal spatial displacement is identified within the lowest resolution 4D image data set (the lowest resolution 4D volume), and the associated 3D motion vector also identified. This is then propagated (mapped) upwards through the different levels of the scale space (i.e. through the different resolution-level 4D volumes). By starting detection at the lowest-resolution (coarse) level, there is provided greater robustness against noise artefacts which otherwise typically affect a 3D or 4D volume (normally resulting in images looking grainy). By then propagating the identified motion sub-region and 3D motion vector from the lowest (coarse) resolution level to the highest resolution (fine) level, accuracy and clarity is still maintained, without compromising the improved noise robustness.

Identifying the 3D sub-region of maximal displacement in accordance with the present example comprises the following sub-steps.

First, the lowest resolution four-dimensional image data set is selected and the first 3D image frame (3D volume) of the 4D image data set is selected. This frame is scanned with a cubic square window (e.g. 7 pixels×7 pixels×7 pixels) to identify all candidate 'peak positions'. By peak position is meant a position of a local intensity peak, this being representative of some structural, or at least graphical, feature and whose movement throughout the course of the 4D image data set may come to identify a sub-region of maximal displacement within the image frame over the course of the 4D data set.

A pre-defined intensity threshold may be used to identify the candidate peak positions. In this case, peak positions may be identified as all points within the image frames whose intensity level exceeds said pre-defined threshold.

Once all candidate peak positions have been found, their motion is then tracked across the course of the series of 3D image frames comprised within the lowest-resolution 4D image data set. This may be performed by tracking the center positions of respective cubic square windows, each updated to move so as to keep a respective one of the peak positions centered within it. The window is then identified whose displacement across the course of the series of 3D image frame is greatest, and the sub-region encompassed within this window is then identified as the 3D sub-region of maximal spatial displacement.

A three-dimensional motion vector is then determined corresponding to the displacement of this identified dominant motion sub-region across the course of the series of 3D frames (e.g. the displacement of the center position of the cubic window corresponding to maximal displacement sub-region).

Determining the motion vector may comprise simply constructing a vector corresponding to the displacement of the maximal displacement sub-region. For example, a co-ordinate position vector of the sub-region within the 3D co-ordinate space of the 4D volume (i.e. the 3D co-ordinate space of the frames of the 4D image data set) may be identified for each of the start and end points of the series of frames (or a portion of it, where applicable) and the two simply subtracted to derive a displacement vector.

Upon thus determining the maximal displacement sub-region and corresponding maximal displacement vector within the lowest resolution 4D image data set (4D volume), this sub-region and the vector is then propagated upwards through the multiple higher resolution image data sets, until the original 4D image data set is reached. By 'propagated' is meant that the identified sub-region and three-dimensional motion vector are mapped in turn from the lowest resolution 4D volume, to the next lowest resolution 4D volume, and so on until both are mapped to the highest resolution 4D volume, i.e. to the 3D frames of the originally obtained 4D image data set.

For the example of FIG. 3, the scale space has only three levels. Hence, in this case, the 3D maximal displacement sub-region and 3D motion vector would need mapping only twice, once to the intermediate resolution 4D volume, and then once again to the original 4D volume.

The mapping maybe achieved in embodiments by firstly increasing the size of the cubic window corresponding to the identified maximal displacement sub-region each time the sub-region is mapped to the next 4D volume. The size increase is in proportion to the size difference between the 3D frames of the two 4D volumes. In examples, the size of the window may double each time, e.g. from 7×7×7 pixels to 14×14×14 pixels to 28×28×28 pixels for a three-level scale space such as in FIG. 3.

In addition to the size increase, the position of the window may be adjusted to center on the same peak position as in the lower resolution image data set. In this way, the method effectively identifies within the 3D frames of the higher resolution 4D volume a sub-region which corresponds to the sub-region of maximal displacement in the 3D frames of the lower resolution 4D volume. The identified 3D motion vector may also be mapped upwards to the highest resolution 4D volume.

In this way, a 3D sub-region of maximal displacement within the series of 3D image frames comprised by the original 4D image data set is identified, along with a corresponding 3D motion vector, where robustness against noise is improved.

Figure 4:
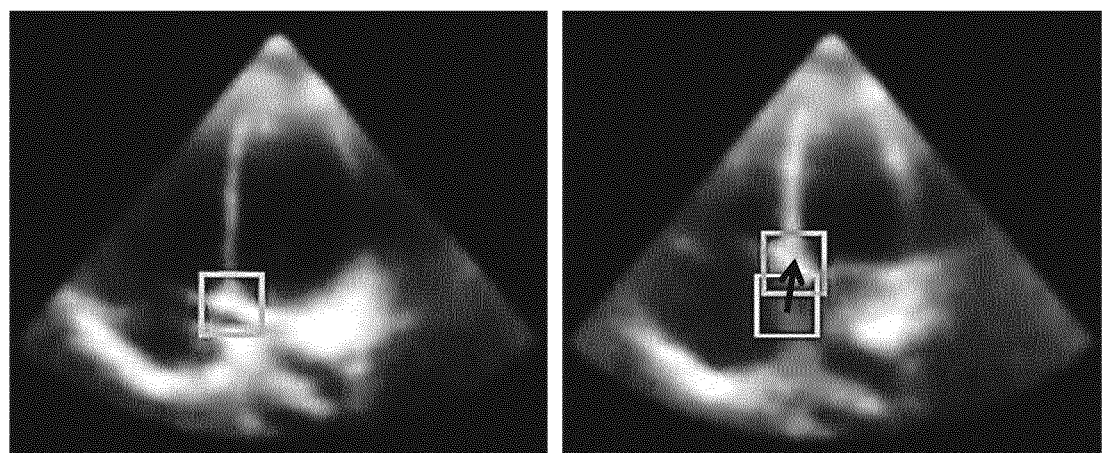
FIG. 4 illustrates identification of an example 3D sub-region of a 3D image frame, and displacement of the sub-region between successive frames.

For illustration, FIG. 4 shows an example detected 3D motion vector for a 4D volume (example 2D slices of a given 3D frame shown) depicting an Apical Four Chamber view of the heart.

The procedure outlined above is performed in turn for each of the two obtained 4D image data sets, so that a respective 3D motion vector is identified for each.

Once a three-dimensional motion vector corresponding to motion of a sub-region of greatest displacement in each of the 4D image data sets has been identified, the method comprises in a fourth step 16 performing an initial pre-registration alignment procedure in which the 3D volumes of one or both of the 4D image data sets are rotated and translated (Rot) so as to bring into alignment their respective identified dominant 3D motion vectors. Bringing into alignment comprises rendering their respective 3D motion vectors at least substantially parallel and coincident with one another.

In this way a 'rough' alignment of 3D volumes of the two 4D image data sets is achieved before more precise registration is then performed. Performance of this initial rotational and translational alignment step is a novel approach, and has been found to yield significantly improved accuracy in the registration results, in particular in cases where the two 4D image data sets correspond to viewpoints separated by a reasonably large angular displacement.

Following the rotation and translation to align the motion-vectors of the two image data sets, there may still remain some rotational non-alignment in the circumferential direction around the aligned 3D motion vector axes.

This may be remedied in a sub-step by performing a normalized 2D image intensity matching procedure using two 2D slices of one or more of the 3D image frames of the two image data sets, the two slices being perpendicular to one another, and arranged intercepting the middle position of the aligned 3D motion vector. By performing intensity matching of these 2D slices, circumferential (i.e. azimuthal) alignment can be improved.

The alignment steps performed up to this point may be represented by a 3×3 rotation matrix and 3×1 translation vector. The overall transformation embodied by these is typically close to the final accurate registration solution, and serves an important procedure for reliably ensuring the convergence of a full optimization process to be performed in the final step (described below).

In a final step 18 of the method, final registration (Reg.) of the two image data sets is achieved by performing an optimization process, based on combined similarity scores of normalized 2D images from selected 2D 'slices'.

Typically, the procedure comprises selecting three orthogonal 2D slices for each 3D image frame (3D volume) of each of the 4D image data sets (where the slices selected for each of the two data sets correspond). A measure or metric of similarity is then determined between corresponding planes in the two image data sets. A combined similarity measure is then determined as the sum of the similarities for the three 2D slices.

The final step of the method optimizes relative orientation of the two 4D volumes to maximize the combined similarity (cost function).

The scale space constructed earlier in the method may also be used in this step. In particular, the optimization may be performed in respect of the frames of the lowest resolution 4D image data set, with the results then being propagated upwards to the highest resolution image data set (e.g. co-ordinate alignments propagated upward to the highest resolution image data set). However, this is optional. The optimization procedure may simply be performed on the original captured image data set, i.e. the highest resolution image data set.

The final step is used in isolation in certain prior-art methods to achieve combination or fusion of two 4D volumes. However, the algorithm in such cases typically leads to inaccurate results, or in some cases does not return any result.

According to the present invention, by first detecting a dominant motion sub-region in each 4D volume and performing an initial rough alignment procedure based on the 3D motion vectors, the final optimization step is provided with a good starting point for then obtaining the final alignment (registration) and fusion of the 4D volumes.

Although in the above example, the two image data sets are obtained directly from two imaging probes, in other examples, the two image data sets may be downloaded or otherwise received via a communication channel or link from a memory store in which they are stored, e.g. from an external computer, memory or data store. The data sets may be received for instance from a remote server, e.g. via a network connection.

Embodiments of the invention find particularly advantageous application in cases in which registration is sought between image data sets representative of different spatial viewpoints of an anatomical region, the viewpoints corresponding to viewing directions being separated by a large angular displacement. For example, the method is particularly advantageous when viewing directions corresponding to the two spatial viewpoints are separated by an angle of at least 25 degrees.

This is because the novel pre-registration alignment step 16 in effect at least partially corrects for these large angular displacements in advance of then performing the optimization procedure.

Although in the example outlined above, identifying the sub-region of maximal displacement and corresponding motion vector is performed based on first deriving a set of reduced resolution image data sets, this is not essential. The said sub-region and motion vector may be identified directly within the original (high resolution) image data set in alternative examples.

Furthermore, although in the example above, a plurality of reduced resolution image data sets is generated, in further examples, a single reduced resolution image data set may instead be generated. In accordance with such examples, the maximum displacement sub-region and maximum displacement vector may be determined based on the reduced resolution data set before being mapped directly to the original 4D image data set.

Although in examples described above, two 4D image data sets are obtained and registered, in further examples, the method may be expanded to achieve registration of more than two image data sets. In such cases, a respective sub-region of maximal displacement and corresponding 3D motion vector may derived for each 4D image set. Relative rotation and translation of all 3D frames of all of the data sets may be performed such as to bring into alignment the respective 3D motion vectors of all of the data sets. The optimization procedure of the final step 18 may then finally be performed, taking into account similarity scores calculated between slices selected from each of the 4D image data sets.

Further aspects in accordance with the invention provide an image data processing device comprising a processor adapted to perform the method outlined above. The processor may employ one or more microprocessors that may be programmed using software (e.g., microcode) to perform the required functions In various implementations, a processor may be associated with one or more storage media such as volatile and non-volatile computer memory such as RAM, PROM, EPROM, and EEPROM. The storage media may be encoded with one or more programs that, when executed on one or more processors, perform the required functions. Various storage media may be fixed within a processor or may be transportable, such that the one or more programs stored thereon can be loaded into a processor.

Figure 5:
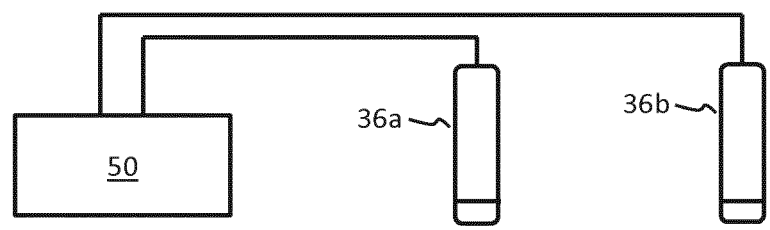
FIG. 5 illustrates an example ultrasound imaging system in accordance with one or more embodiments of the invention.

Examples in accordance with a further aspect of the invention provide an ultrasound imaging system. An example is shown in FIG. 5.

The system comprises a processor assembly 50 to which are operatively coupled two ultrasound transducer units 36a, 36b in the form of ultrasound imaging probes.

The processor assembly 50 is adapted to:
process signal data received from the one or more ultrasound transducer units 36a, 36b to obtain two different four-dimensional image data sets, each comprising image data representative of a time series of three dimensional image frames of a common anatomical region;
identify for each four-dimensional image data set a respective three-dimensional motion vector indicative of motion of an identified three-dimensional sub-region which exhibits maximal spatial displacement over at least a portion of the respective time series of frames;

perform a rotation and translation of one or both of the four-dimensional image data sets such as to bring their respective three-dimensional motion vectors into alignment; and perform a further transformation of one or both of the image data sets having aligned three-dimensional motion vectors, based on an image registration procedure, such as to bring the two image data sets into spatial registration.

The ultrasound transducer units 36*a*, 36*b* may each include one or more ultrasound transducers for generating ultrasound oscillations. Each of the one or more transducer units may comprise an ultrasound transducer array. The transducer units may be adapted for transmitting ultrasound signals into the body of a patient and sensing echo signals. The echo signals may be processed by a signal processor to thereby generate the 4D image data sets.

In examples, the processor assembly 50 may comprise a single processor, or may make use of a plurality of processors, e.g. each for performing a dedicated task.

In the example of FIG. 5, the system comprises two ultrasound transducer units 36*a*, 36*b*. The two different four-dimensional image data sets are in accordance with this example obtained using signal data received from a different one of the two ultrasound transducer units. The two transducer units may be positioned at different locations relative to the anatomical region being imaged, such as is shown in FIG. 2.

However, in alternative examples, the system may comprise a single ultrasound transducer unit, and wherein the two different four-dimensional image data sets are obtained using signal data captured by the single transducer unit over different respective time periods. The transducer unit may for instance be moved to different locations relative to the anatomical region being imaged between capturing of the two 4D image data sets. For instance, the transducer unit might in examples be positioned in the position of probe 36*a* in FIG. 2 when capturing the first image data set, and in the position of probe 36*b* when capturing the second image data set 36*b*.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Any reference signs in the claims should not be construed as limiting the scope.

The invention claimed is:

1. An image data processing method for spatially registering two image data sets, comprising:
    obtaining two different four-dimensional image data sets, each comprising image data representative of a time series of three dimensional image frames of a common anatomical region;
    identifying for each four-dimensional image data set a respective three-dimensional motion vector indicative of motion of an identified three-dimensional sub-region which exhibits maximal spatial displacement through the course of at least a part of the respective time series of three dimensional image frames comprised in the four-dimensional image data set;
    performing a rotation and translation of one or both of the four-dimensional image data sets such as to bring their respective three-dimensional motion vectors into alignment; and
    performing a further transformation of one or both of the image data sets having aligned three-dimensional motion vectors, based on an image registration procedure, such as to bring the two image data sets into spatial registration.

2. A method as claimed in claim 1, wherein identifying the three-dimensional motion vector comprises, for at least one of the four-dimensional image data sets:
    processing the image data set to derive a corresponding reduced resolution image data set; and
    identifying within the reduced resolution image data set said three-dimensional sub-region exhibiting maximal spatial displacement across at least a part of the series of three dimensional image frames represented by the four-dimensional image data set.

3. A method as claimed in claim 2, further comprising identifying a three-dimensional sub-region within the original image data set corresponding to the sub-region identified in the reduced resolution data set and wherein identifying the three-dimensional motion vector comprises identifying a vector indicative of motion of said corresponding region in the original image data set.

4. A method as claimed in claim 3, wherein identifying said corresponding sub-region within the original data set comprises sequentially mapping the identified sub-region of maximal spatial displacement in turn between the reduced resolution image data sets, starting from the lowest resolution data set and subsequently proceeding to the original data set.

5. A method as claimed in claim 4, wherein each of the plurality of reduced resolution image data sets is representative of a respective time-series of 3D image frames having reduced overall size, and wherein the mapping from one reduced resolution image data set to another comprises increasing a size of said identified sub-region of maximal displacement in proportion to a difference in relative sizes of 3D image frames of the two reduced resolution image data sets.

6. A method as claimed in claim 2, wherein the method comprises processing the at least one four dimensional image data set to derive a plurality of reduced resolution image data sets, each having a different respective resolution, and identifying said three-dimensional sub-region exhibiting maximal spatial displacement within the reduced resolution image data set having lowest resolution.

7. A method as claimed in claim 2, wherein generating the reduced resolution image data set(s) comprises processing the four-dimensional image data set with a low pass spatial filter.

8. A method as claimed in claim 1, wherein the image registration procedure is based on maximizing a similarity metric determined between one or more frames comprised by each of the image data sets.

9. A method as claimed in claim 1, wherein the further transformation comprises a translation.

10. A method as claimed in claim 1, wherein the two four-dimensional image data sets comprise image data representative of different spatial viewpoints of the anatomical region.

11. A method as claimed in claim 10, wherein viewing directions corresponding to the two spatial viewpoints are separated by an angle of at least 25 degrees.

12. A method as claimed in claim 1, wherein the method is an ultrasound image data processing method.

13. A method as claimed in claim 1, wherein said common anatomical region represented by the two four-dimensional image data sets corresponds to a region encompassed by an apical four chamber view of a heart.

14. An image processing device comprising:
a processor adapted to
obtain two different four-dimensional image data sets, each comprising image data representative of a time series of three dimensional image frames of a common anatomical region;
identify for each four-dimensional image data set a respective three-dimensional motion vector indicative of motion of an identified three-dimensional sub-region which exhibits maximal spatial displacement through the course of at least a part of the respective time series of three dimensional image frames comprised in the four-dimensional image data set;
perform a rotation and translation of one or both of the four-dimensional image data sets such as to bring their respective three-dimensional motion vectors into alignment; and
perform a further transformation of one or both of the image data sets having aligned three-dimensional motion vectors, based on an image registration procedure, such as to bring the two image data sets into spatial registration.

15. An image processing device as claimed in claim 14, wherein for identifying the three-dimensional motion vector for at least one of the four-dimensional image data sets, the processor is further adapted to:
derive from the image data set a corresponding reduced resolution image data set; and
identify within the reduced resolution image data set said three-dimensional sub-region exhibiting maximal spatial displacement across at least a part of the series of three dimensional image frames represented by the four-dimensional image data set.

16. An image processing device as claimed in claim 15, wherein the processor is further adapted to:
identify a three-dimensional sub-region within the original image data set corresponding to the sub-region identified in the reduced resolution data set, and wherein identifying the three-dimensional motion vector further comprises identifying a vector indicative of motion of said corresponding three-dimensional sub-region in the original image data set.

17. An image processing device as claimed in claim 16, wherein the processor is further adapted to:
identify said corresponding sub-region within the original data set via sequentially mapping the identified sub-region of maximal spatial displacement in turn between the reduced resolution image data sets, starting from the lowest resolution data set and subsequently proceeding to the original data set.

18. An image processing device as claimed in claim 15, wherein the processor is further adapted to:
derive for the at least one four dimensional image data set a plurality of reduced resolution image data sets, each having a different respective resolution, and
identify said three-dimensional sub-region exhibiting maximal spatial displacement within the reduced resolution image data set having lowest resolution.

19. An ultrasound imaging system comprising:
one or more ultrasound transducer units; and an image processing device as claimed in claim 14,
wherein the processor of the image processing device is comprised in
a processor assembly of the ultrasound imaging system, and
wherein the processor is further adapted to process signal data received from the one or more ultrasound transducer units to obtain the two different four-dimensional image data sets.

20. An ultrasound imaging system as claimed in claim 19, wherein:
the system comprises two ultrasound transducer units, and wherein a first image data set of the two different four-dimensional image data sets is obtained using signal data received from a first of the two ultrasound transducer units and a second image data set of the two different four-dimensional image data sets is obtained using signal data received from a second of the two ultrasound transducer units; or
the system comprises a single ultrasound transducer unit, and wherein the two different four-dimensional image data sets are obtained using signal data captured by the single transducer unit over different respective time periods.

* * * * *